United States Patent [19]

Nomura

[11] 4,169,670
[45] Oct. 2, 1979

[54] DEVICE FOR INDICATING THE COMPLETION OF WINDING OF THE SHUTTER OF A CAMERA

[75] Inventor: Katsuhiko Nomura, Kawagoe, Japan

[73] Assignee: Asahi Kogaku Kogyo Kabushiki Kaisha, Tokyo, Japan

[21] Appl. No.: 830,287

[22] Filed: Sep. 2, 1977

[30] Foreign Application Priority Data

Sep. 3, 1976 [JP] Japan .................. 51/11853

[51] Int. Cl.$^2$ ............................................. G03B 17/00
[52] U.S. Cl. ................................. 354/289; 354/226; 354/246; 354/249
[58] Field of Search .............. 354/204, 205, 206, 226, 354/249, 289, 246

[56] References Cited

U.S. PATENT DOCUMENTS

| | | | |
|---|---|---|---|
| 1,149,493 | 8/1915 | Berwick | 354/204 |
| 3,829,876 | 8/1974 | Uno et al. | 354/204 |
| 3,903,539 | 9/1975 | Kitai et al. | 354/249 |

Primary Examiner—Russell E. Adams
Attorney, Agent, or Firm—Sughrue, Rothwell, Mion, Zinn and Macpeak

[57] ABSTRACT

A camera with a focal plane shutter is provided with a device for indicating the completion of the winding of the shutter. The indicating device is a spring biased lever having one end which engages a metal blade or blade driving member of the shutter when the shutter is wound to rotate the lever against the biasing force of the spring. Under this condition a red portion of the other end of the lever is viewable through a window in the camera body. When the shutter is released, the metal blade or blade driving member moves to a retracted position allowing the lever to rotate under the biasing force of the spring. As a result a black portion of the other end of the lever is viewable through the window.

2 Claims, 1 Drawing Figure

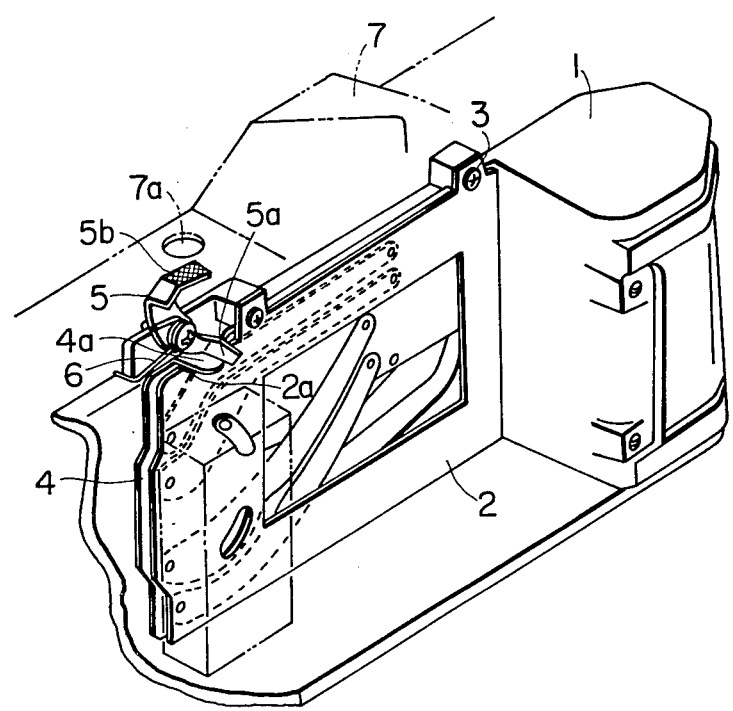

DEVICE FOR INDICATING THE COMPLETION OF WINDING OF THE SHUTTER OF A CAMERA

SUMMARY OF THE INVENTION

This invention relates generally to the indication of the completion of the winding of a shutter in a camera. More particularly, the invention is directed to providing a device for indicating the completion of the winding of a shutter for a focal plane shutter camera preferably with metal blades, wherein when the shutter is wound, "red" appears in a window in the camera body, and when the shutter is released, the indication is turned to "black". This indication is achieved by a few members, whereby an operator of a camera can always known from the exterior of the camera body through a window whether or not the shutter has been wound up.

BRIEF DESCRIPTION OF THE DRAWING

In the accompanying drawing, the sole FIGURE is a perspective view showing an indicating device according to the present invention.

DETAILED DESCRIPTION OF THE PREFERRED EMBODIMENT

A preferred embodiment of the present invention will now be described in conjunction with the accompanying drawing. A shutter block 2 is fastened by a screw 3 to a camera body 1. A rear curtain member 4 is provided in shutter block 2 in a manner that a portion 4a of the member is adapted to project from a cut portion 2a of the block when the shutter is wound, and to retract therefrom after the shutter has been released. The member 4 is a blade driving member, but as will be appreciated from the following description, a portion of the shutter blade itself can instead project from the cut portion 2a. If the shutter blade is used, it should be metal. An indication lever 5 is disposed with its end piece 5a contacting the wall of cut portion 2a and normally biased by the spring 6 in the clockwise direction, as viewed in the drawing. Upon completion of the winding of the shutter, since the portion 4a of shutter rear curtain member 4 assumes a projected position from the cut portion 2a, indication lever 5 is urged in the counterclockwise direction against the biasing force of spring 6, so that a red portion 5b on the other end of indication lever 5 is positioned below a window 7a provided in a top decorative plate 7, with the result that "red" is viewed through window 7a from the exterior of the camera body. When the shutter is released and the rear curtain travels, the portion 4a of the shutter rear curtain member 4 is moved from the cut portion 2a to a retracted position, so that indication lever 5 may be turned in the clockwise direction under the biasing force of spring 6, whereby a black portion 5c on another end portion of the lever is positioned below the window 7a in top plate 7, with the result that "black" is viewed from the exterior of the camera body. An operator of the camera thus can known that the shutter has been released.

The object contemplated by the invention is thus attained by a device which is simple and inexpensive in construction.

What is claimed is:

1. In a camera with a focal plane shutter, wherein the shutter comprises a plurality of metal blades and is housed within a shutter block having a cut portion through which a part of the shutter mechanism projects when the shutter is wound, a device for indicating the completion of the winding of the shutter comprising:

an indicating lever mounted within the camera body with one end of the lever positioned to engage said part of the shutter mechanism and the other end viewable through a window in the camera body, wherein said part of the shutter mechanism is a metal shutter blade.

2. In a camera with a focal plane shutter, wherein the shutter comprises a plurality of metal blades and is housed within a shutter block having a cut portion through which a part of the shutter mechanism projects when the shutter is wound, a device for indicating the completion of the winding of the shutter comprising:

an indicating lever mounted within the camera body with one end of the lever positioned to engage said part of the shutter mechanism and the other end viewable through a window in the camera body, wherein said part of the shutter mechanism is a blade driving member.

* * * * *